United States Patent Office 3,385,898
Patented May 28, 1968

3,385,898
PROCESS FOR THE PREPARATION OF ALKYL-AROMATIC ALDEHYDES FROM ALKYLAROMATIC HYDROCARBONS
William D. Vanderwerff, West Chester, Pa., assignor to Sun Oil Company, Philadelphia, Pa., a corporation of New Jersey
No Drawing. Filed Dec. 21, 1966, Ser. No. 603,427
8 Claims. (Cl. 260—599)

ABSTRACT OF THE DISCLOSURE

A process preparing alkylaromatic aldehydes by oxidizing chloromethyl alkylaromatic compounds with a hot (i.e., about 100–380° C.) aqueous alkali-metal or ammonium vanadate under pressure. Preferably the reaction employs a temperature of about 200–275° C., a sodium metavanadate solution and autogenous pressure.

---

This invention is directed to the preparation of aromatic aldehydes, and more particularly pertains to the selective oxidation of a chloromethylated alkylaromatic compound with a novel alkali metal vanadate oxidizing agent to produce alkylaromatic aldehydes.

Many prior art processes have been made available heretofore for oxidizing alkylaromatic hydrocarbons and the like to aldehydes and acids. Some of these have even provided for selectivity to produce alternatively aromatic aldehydes and acids. While many of these processes are quite effective in certain respects, they leave room for considerable improvement in respect to selectivity and/or control in producing aromatic aldehydes. They either lack selectivity and attack more than one substituent and/or lack control in the degree of oxidation so to produce quantities of more highly oxidized by-products, such as carboxylic acids, anhydrides and the like when the aldehyde is sought. While alkylaromatic carboxylic acids may be highly desired on the one hand, they may not be desired on other occasions, and in such instances their appearance in the product is disadvantageous.

To be more specific, the prior art techniques of any importance applicable to the preparation of aromatic aldehydes, together with significant deficiencies thereof known to those skilled in the art are as follows:

(1) Liquid or vapor-phase autoxidation. These processes are of limited use for aromatic aldehydes other than benzaldehyde and some of its homologs due to oxidative attack on the aromatic nucleus (both processes) formation of phenolic inhibitors (liquid phase) and low volatility of products (vapor phase).

(2) Oxidation by manganese dioxide in sulfuric acid. An effective process, but commercially limited by a non-regenerable oxidant.

(3) Etard oxidation. A useful oxidative technique limited to laboratory use by its hazardous nature and expensive oxidant (chromyl chloride).

(4) Hydrolysis of dichloromethylaromatics. This process utilizes an expensive chlorination which invariably yields a chlorine-contaminated product.

(5) Gattermann-Koch and related carbonylation techniques. This process, while quite workable, employs corrosive and hazardous reactants such as carbon monoxide, hydrogen fluoride and boron trifluoride. Furthermore, it is limited in its ability to produce certain isomers by the inherent reactivity of the aromatic substrate.

(6) Preparation from chloromethylaromatics. Existing techniques, which include the Sommelet and Kröhnke reactions and oxidation by dilute nitric acid, aqueous ferric salts or lead nitrate, have serious limitations to commercial application.

Some of the foregoing processes and still other processes employ relatively hazardous materials, such as selenium compounds, to obtain acceptable yields.

A process such as the present process is to be commended for obviating or at least substantially ameliorating the important deficiencies of the prior art methods in preparing alkylaromatic aldehydes.

It is, accordingly, an important object to provide a process with a high degree of selectivity and control for the production of aromatic and alkylaromatic aldehydes.

It is a further object to produce alkylaromatic aldehydes relatively free of bifunctional by-products.

It is still a further object to provide such a process wherein the oxidizing agent can be readily regenerated for reuse.

It is yet another object to provide an oxidation process which avoids the use of relatively toxic or hazardous materials.

Other related objects will become apparent from the discussion hereinafter.

To the accomplishment of the foregoing and related ends in regard to the selective preparation of alkylaromatic aldehydes, a chloromethyl alkylaromatic compound is reacted with a hot aqueous alkali-metal or ammonium vanadate solution at a temperature of about 100° to 380° C. at autogenous pressure.

To facilitate the understanding of the chemistry involved, the invention is set forth in the form of a chemical equation.

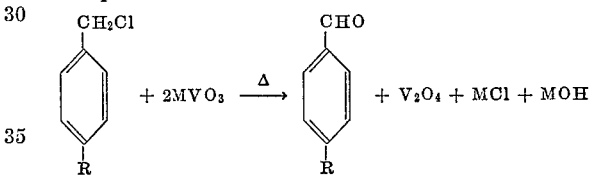

In the above equation, M represents an alkali metal, for example, sodium, potassium, lithium and ammonium.

The hot, aqueous vanadate solution mentioned above operates as an oxidizing agent in this invention, and, in fact, as a very selective oxidizing agent. This is not to be confused with situations wherein it is made to act in catalytic fashion to produce a different result. Such a catalytic process is described and claimed by me in a related application Ser. No. 629,365, filed Apr. 19, 1967. Preferred alkali-metal vanadates, are, for example, sodium metavanadate, potassium metavanadate, and lithium metavanadate. Other vanadates, such as ortho- and pyrovanadates may equally be suitable or even preferable in certain circumstances. Usually sodium metavanadate is to be most preferred, but exceptions to this general principle will be found under certain circumstances.

The temperatures that typically will be found suitable are in the range of about 100° to 380° C. Preferably temperatures on the order of about 200° to 275° C. are employed, although temperatures outside that range will be found desirable on occasion. The higher temperatures have the effect of altering the physical form of the $V_2O_4$ produced from fibers to flakes and utilmately to a powder and also of reducing the amount of by-product ether formed.

The process is conveniently carried out at autogenous pressure, which approximates the vapor pressure of water at the temperature employed. Higher pressures can be used and even slightly lower pressures also, but there is little, if any, incentive for operating at any pressure other than autogenous, since it is effective and most convenient.

The chloromethyl aromatics which can be oxidized by this invention are generally speaking those chloromethylaryls wherein the aromatic nucleus is benzene, naphthalene or polynuclear aromatic and which can be substituted by one or more normal or branched alkyl groups containing about 1 to 20 carbon atoms each. For example: chloromethyltoluene; chloromethylxylenes; chloromethylethylbenzenes, such as 1-chloromethyl-4-ethylbenzene;
chloromethyltetramethylbenzenes;
1-chloromethyl-3-octylbenzene;
1-chloromethyl-4-eicosylbenzene;
chloromethyldiethylbenzene;
1-chloromethyl-3-methyl-5-propylbenzene;
chloromethylhexylbenzene;
chloromethyldihexylbenzene;
chloromethylbutyldodecylbenzene;
chloromethyltetradecylbenzene;
chloromethyldidodecylbenzene;
chloromethyleicosylbenzene; and
chloromethyldieicosylbenzene.

Other examples are chloromethylmethylnaphthalenes;
chloromethylethylnaphthalenes;
chloromethyleicosylnaphthalenes;
chloromethyldimethylnaphthalenes, such as 4-chloromethyl-1,2-dimethylnaphthalene;
4-chloromethyl-1-methyl-6-ethylnaphthalene;
4-chloromethyl-2,6-dimethylnapthalene;
3-chloromethyl-1-methyl-5-hexylnaphthalene;
1-chloromethyl-8-pentylnaphthalene;
1-chloromethyl-2-ethyl-7-nonylnaphthalene;
1-chloromethyl-6-decylnaphthalene;
2-chloromethyl-6-decylbenzene;
4-chloromethyl-2,6-dibutylnaphthalene;
1-chloromethyl-2,7-dihexylnaphthalene;
4-chloromethyl-6-dodecylnaphthalene;
4-chloromethyl-2,6-didodecylnaphthalene;
1-chloromethyl-2-methyl-6-octadecylnaphthalene;
4-chloromethyl-2,6-dieicosylnaphthalene and the like, and mixtures of the foregoing.

Where the particular chloromethyl alkylaromatic compound starting material for the oxidation reaction is not available, it can readliy be prepared, for example, by the conventional and well-known chloromethylation reaction. Other methods, however, may also be used, such as direct chlorination.

Skilled chemists by now will have realized that this reaction employs a heterogeneous system, and accordingly, to get efficient reaction, some agitation of the reactants will be highly desirable. Any conventional agitation means can be employed with adequate success since that feature is not critical.

As the equation hereinabove indicates, theoretically a ratio of reactants or about 2 moles of the alkali-metal vanadate is employed per mole of chloromethyl alkylaromatic, and such a ratio is preferred. An excess of the vanadate, however, can be used but is unnecessary.

Reaction times for carrying out the invention can readily be determined without difficulty, but usually is on the order of about ½ to 4 hours. Sometimes, however, much shorter reaction times will suffice.

To further facilitate the understanding of the invention, certain details and illustrative embodiments will now be set forth; however, of course, it is to be fully understood and appreciated that the invention is not limited to the specific conditions or details set forth in these examples, since the process is capable of many modifications and variations being aided, suggested or indicated by the discussion of the process as found herein and the discussions of the trends of the effect of the various factors.

Illustrative example 400 ml. of a one molar solution of sodium meta-vanadate is charged to a one-liter rocking autoclave. About 0.2 mole of 1-chloromethyl-2,4-dimethylbenzene is also charged to the autoclave. The autoclave is sealed and heated to about 275° C., where it is maintained for about 4 hours. The crude reaction mixture is cooled and filtered. The filter cake is washed with ether and the filtrate is extracted with ether. The ether is evaporated from the combined extracts and the crude product is distilled to recover 2,4-dimethylbenzaldehyde. Small amounts of 2,4-dimethylbenzyl alcohol and bis-(2,4-dimethylbenzyl)ether are also recovered.

Substantially the same results are obtained when 1-chloromethyl - 2,3 - dimethylbenzene; 1-chloromethylcumene; and 1-chloromethyl-4-methylnaphthalene are substituted for the 1-chloromethyl-2,4-dimethylbenzene in the foregoing procedure.

Having now described the invention, many ramifications and modified embodiments will readily occur to those skilled in the art. Insofar as such variations do not depart from the spirit and scope of the invention described in this application, they are intended to be embraced by the appended claims in their broadest construction.

The invention claimed is:

1. A process for the selective preparation of alkyl aromatic aldehydes comprising reacting a chloromethyl alkylaromatic compound with aqueous alkali-metal vanadate or ammonium vanadate solution under substantially autogenous pressure at a temperature of about 100 to 380° C.

2. A processing according to claim 1 wherein the temperature is about 200 to 275° C.

3. A process according to claim 1 wherein said vanadate solution is a sodium vanadate solution.

4. A process according to claim 2 wherein said vanadate solution is an alkali-metal metavanadate solution.

5. A process according to claim 4 wherein the sodium vanadate solution is a sodium metavanadate solution.

6. A process according to claim 4 wherein the alkyl groups of said chloromethyl alkylaromatic compounds contain about 1 to 20 carbon atoms.

7. A process according to claim 5 wherein the vanadate compound is employed at a mole ratio of about 2:1 based on the chloromethyl alkylaromatic compound.

8. A process according to claim 1 wherein the alkyl groups of said chloromethyl alkyl compound groups contain from 1 to 20 carbon atoms and said vanadate solution is sodium metavanadate employed in the mole ratio per mole of chloromethyl alkylaromatic of about 2:1 and the temperature employed is in the range of about 200 to 275° C. and the pressure is autogenous pressure.

References Cited

UNITED STATES PATENTS

| 1,908,918 | 5/1933 | Reddelien et al. | 260—599 |
| 3,089,908 | 5/1963 | Schult et al. | 260—599 |

FOREIGN PATENTS

| 115,244 | 4/1919 | Great Britain. |

BERNARD HELFIN, *Primary Examiner.*